UNITED STATES PATENT OFFICE.

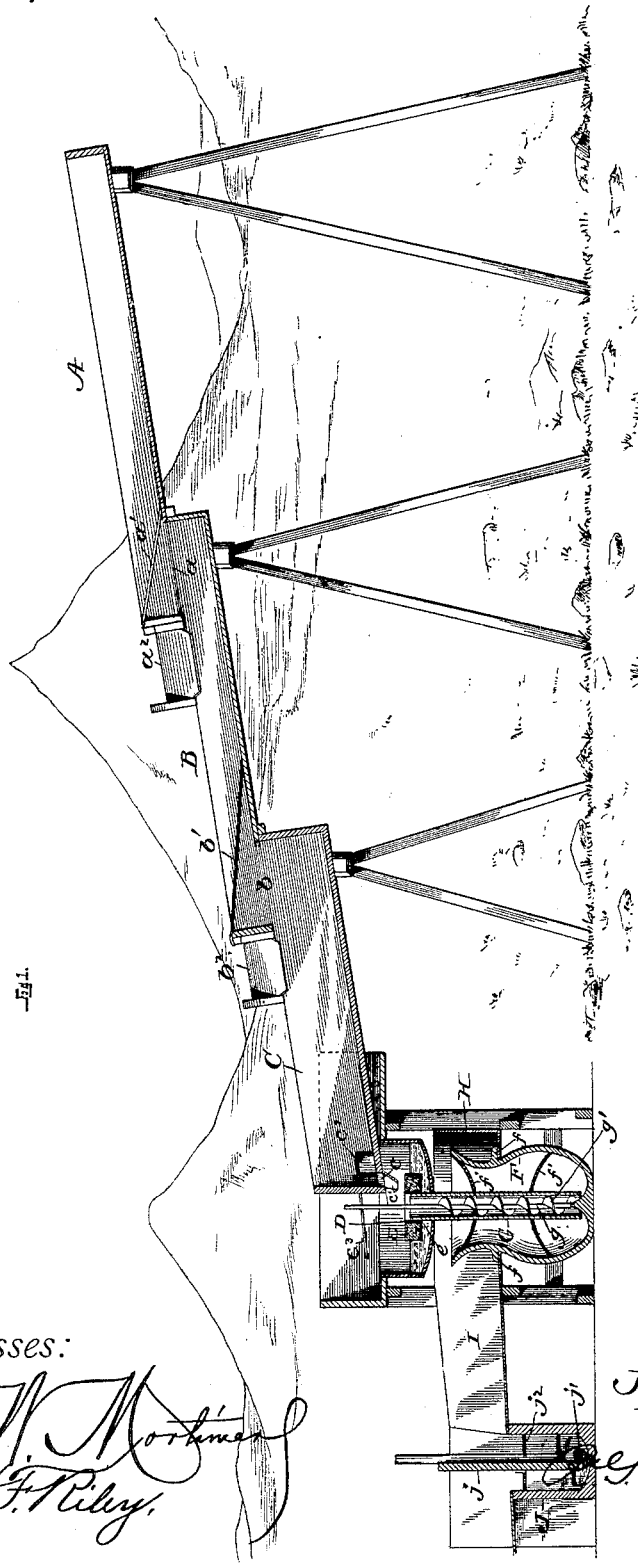

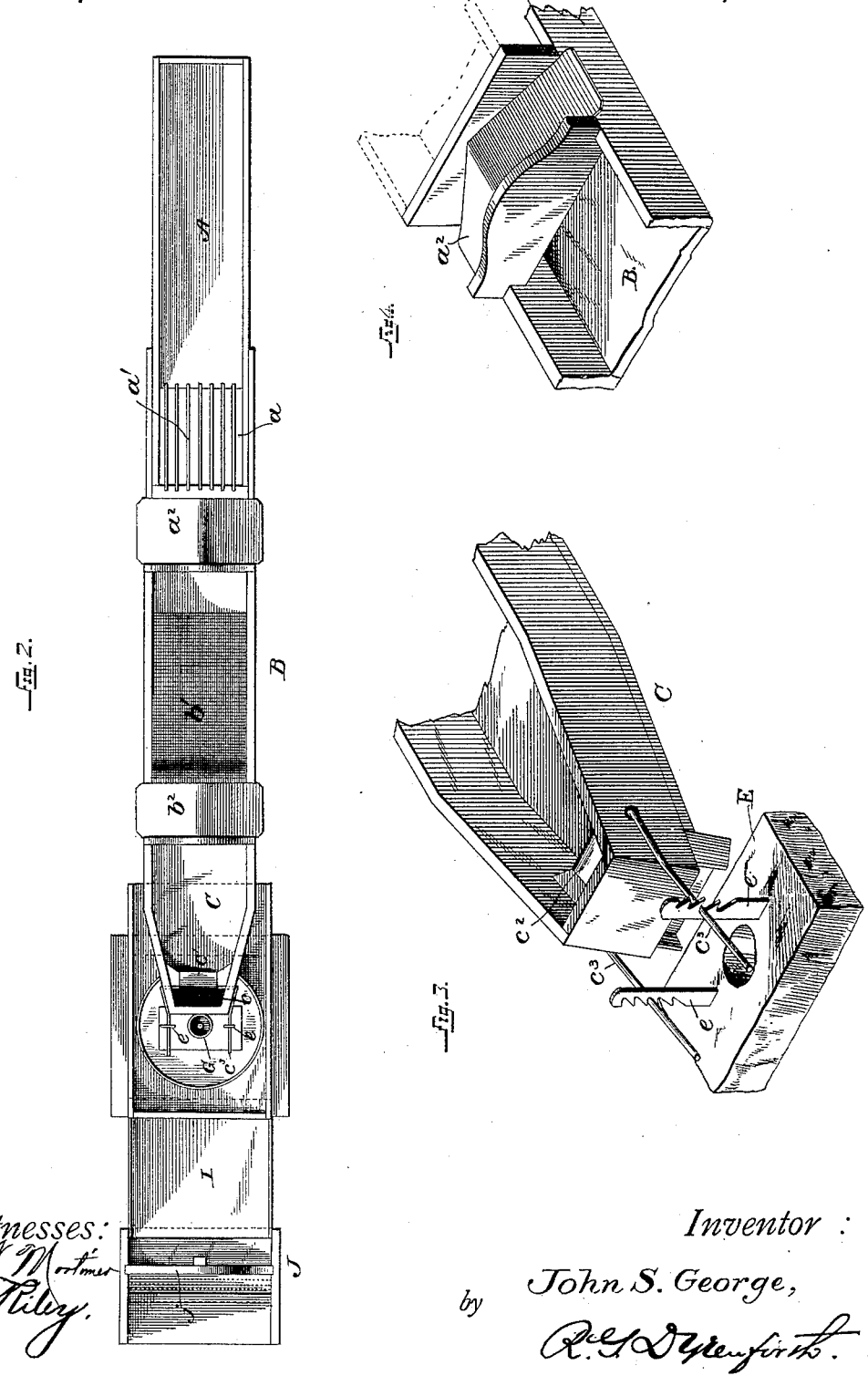

JOHN S. GEORGE, OF NEWPORT, OREGON, ASSIGNOR OF ONE-HALF TO J. W. BRASFIELD, OF SAME PLACE.

GOLD-SEPARATING APPARATUS.

SPECIFICATION forming part of Letters Patent No. 394,112, dated December 4, 1888.

Application filed March 29, 1887. Serial No. 232,854. (No model.)

*To all whom it may concern:*

Be it known that I, JOHN S. GEORGE, a citizen of the United States, residing at Newport, in the county of Benton and State of Oregon, have invented certain new and useful Improvements in Gold-Separating Apparatus; and I do hereby declare the following to be a full, clear, and exact description of the invention, such as will enable others skilled in the art to which it appertains to make and use the same.

My invention relates to gold-separating apparatus.

The object of my invention is to produce a machine which will separate the gold from the sand and gravel more effectively than has heretofore been done, preventing any possibility of its escape, and accomplishing the required result simply, cheaply, and economically.

The invention consists in a feed sluice or box, into which the sand and water are discharged from the separating-sluices or sieve-boxes, having at one end a discharge-opening for the sand and water and an automatic valve for governing the discharge of the same; furthermore, in a feed sluice or box having a discharge-opening and valve at its lower end, and a feed-hopper into which said feed-sluice discharges, the valve in the feed-sluice being automatically operated by a float within the feed-hopper to regulate the supply of sand and water to the hopper; furthermore, in a pipe leading from the feed-hopper into an amalgamator, said pipe containing a spiral flange, around which the sand and water circulate in their passage through the pipe, and an acid-pipe, by which acid may be injected into the amalgamating-pan through the feed-pipe; furthermore, in a tub and bed-plate encircling the amalgamating kettle or pan to catch the overflow of the amalgamating-pan, and a settler or box into which the overflow is discharged, said settler or box having a concave bottom, an upright partition, beneath which the water and sand pass, a perforated pipe upon one side to admit an extra flow of water to save any gold or floured quicksilver, and a sieve or sieves on the receiving side to break the fall of water, gold, or floured quicksilver, also a sieve within the discharge side of the settler to strain the water before its discharge into the waste-box.

In the accompanying drawings I have illustrated an embodiment of my invention, in which—

Figure 1 is a vertical longitudinal section through the sluices, amalgamating kettle or pan, and settler. Fig. 2 is a plan view of the same. Fig. 3 is a perspective view of the lower end of the feed-sluice, showing the float and means by which it operates the valve; and Fig. 4 is a perspective view of one of the bridges by which the rock or gravel is thrown from the sluice-boxes.

A represents the box or sluice into which the sand to be washed is placed. This box is inclined and has at its lower end an opening, $a$, covered by a wire screen, $a'$, which screen extends from the upper end of the opening to the top of the lower end of the box. This screen separates the large pieces of rock from the fine gravel and sand which pass into the box B through the opening $a$, while the rock is thrown upon the bridge $a^2$, resting upon the box B at the end of the box A, and discharged upon the outside. The box B is also inclined, and has an opening, $b$, at its end covered by a fine screen, $b'$, which separates the gravel and coarse sand and lets the water and fine sand meet a screen in the feed-sluice C, upon which the lower end of the box B rests. At the end of the box B and resting upon the feed-sluice is a second bridge, $b^2$, which throws out the gravel and coarse sand retained by the screen $b'$. At the lower end of the feed-sluice C is an opening, $c$, and spout $c'$, discharging into a feed-hopper, D. The opening $c$ is covered by a valve, $c^2$, having arms $c^3$ extending forward upon the outside of the box through openings in its sides, which arms are engaged by racks $e$, extending upward from a float, E, in the feed-hopper D.

An egg-shaped amalgamating-pan, F, is placed directly beneath the feed-hopper, and is connected therewith by a large inlet-pipe, G, which stands upright in the kettle and surrounds a projection extending from the bottom of the same and extends into the feed-hopper a short distance above its bottom through an opening, e, in the float. This inlet-pipe G has passing through its center a small perforated standard or pipe, g, around which is arranged a spiral flange, g', down which the water and sand pass into the kettle containing the mercury. The small pipe g is used to inject acid into the amalgamating-pan, by which arrangement the acid is fed immediately upon the mercury. Upon the outside of the kettle is a flange, f, to which is bolted the bed-plate of a tub, H, to catch the overflow, which overflow is strained before leaving the kettle by two concavo-convex screens, f', and is then carried through the tail-sluice I to the settler or box J.

The settler is composed of a box with a concave bottom, having at its center an upright partition, j, which divides the box into two compartments. The first compartment, into which the sand and water from the amalgamating-kettle are discharged, has near its bottom a perforated pipe, j', leading from the main water-head, which admits an extra supply of water in the concave lining at the bottom of the box for the purpose of saving any gold or floured quicksilver that may pass from the kettle. The flow of sand and water falls on a screen, $j^2$, in the first compartment, and passes beneath the partition j into the second compartment, which has a fine screen near its top to again strain the water before passing to the waste-box.

Should there be a too rapid supply of the water and sand from the sluice-boxes to the kettle, the water will accumulate in the feed-hopper D, thereby raising the float and allowing the valve in the end of the feed-sluice to close until the discharge into the kettle reduces the amount of water in the hopper, lowering the float, which opens the valve and again permits the flow.

Having thus described my invention, what I claim as new, and desire to secure by Letters Patent, is—

1. In a gold-separating apparatus, the combination of the feed-sluice, the amalgamator, and the valve located between the feed-sluice and amalgamator, and a float operating the valve, substantially as described.

2. In a gold-separating apparatus, the combination of a feed-sluice, the feed-hopper, the amalgamator, and the float-valve, substantially as described.

3. In a gold-separating apparatus, the combination of the feed-sluice, the feed-hopper, and the float-valve comprising the float having the rack and the arm pivoted in the end of the feed-sluice and carrying the valve proper and amalgamator, substantially as described.

4. In a gold-separating apparatus, the combination of a feed-sluice and amalgamator, a feed-hopper located between the sluice and amalgamator, and a valve consisting of the float in the feed-hopper and the valve proper located in the end of the feed-sluice, the valve and float being connected, substantially as described.

5. In a gold-separating apparatus, the combination of the feed-sluice and amalgamator, the feed-hopper, the float-valve consisting of the float having a rack, and the pivoted arm carrying the valve proper, substantially as described.

6. In a gold-separator, the combination, with the feed-sluice and feed-hopper provided with the float-valve, an amalgamator having one or more screens, and an inlet-pipe containing a spiral flange, of a settling-box having an upright partition, substantially as described.

7. In a gold-separator, the combination of the feed-sluice and amalgamator, the settler having an upright partition extending nearly to the bottom, a water-pipe, and one or more screens, substantially as described.

In testimony whereof I affix my signature in presence of two witnesses.

JOHN S. GEORGE.

Witnesses:
WILLIAM DAVID COLLINS,
WM. ROBERTS.